United States Patent [19]

Allington

[11] 3,798,531

[45] Mar. 19, 1974

[54] SWITCHING-MODE POWER SUPPLY

[75] Inventor: Robert W. Allington, Lincoln, Nebr.

[73] Assignee: Instrumentation Specialties Company, Lincoln, Nebr.

[22] Filed: June 5, 1972

[21] Appl. No.: 259,476

[52] U.S. Cl. ................................ 321/18, 323/22 T
[51] Int. Cl. ........................................... H02m 1/08
[58] Field of Search ............ 321/15, 18; 323/22 ZS, 323/22 SC, 22 T

[56] References Cited
UNITED STATES PATENTS

| | | | |
|---|---|---|---|
| 3,486,105 | 12/1969 | Breniere | 321/18 |
| 3,461,376 | 8/1969 | Wanlass | 321/18 X |
| 3,386,024 | 5/1968 | Koltuniak et al. | 321/18 X |
| 3,160,808 | 12/1964 | Kruse, Jr. | 323/22 T |
| 3,202,900 | 8/1965 | McGivern | 321/15 X |
| 3,335,360 | 8/1967 | Reinert | 323/22 ZS |
| 3,363,143 | 1/1968 | Cavanaugh | 323/22 SC |
| 3,538,418 | 11/1970 | Allington | 321/18 |

OTHER PUBLICATIONS

IBM Technical Disclosure Bulletin, "Current Zero--Crossing Detection For Thyristor Control," Vol. 15, No. 3, August, 1972.

Primary Examiner—William M. Shoop, Jr.
Attorney, Agent, or Firm—Vincent L. Carney

[57] ABSTRACT

To control the portion of each half cycle of alternating current that is conducted from the transformer to a rectifying voltage multiplier by a feedback-controlled alternating-current switch of a switching-mode power supply, the amplitude of a timing ramp potential which starts with the beginning of each half cycle of alternating current is compared to the amplitude of negative feedback from the power supply output by a differential amplifier that switches a single transistor in the alternating current switch into its conducting state when the timing ramp potential has a lower amplitude than the feedback and into its nonconducting state when the timing ramp potential has a higher amplitude than the feedback, with the transistor controlling the alternating current conducted through a diode bridge circuit connecting the transformer to the rectifying voltage multiplier so that a beginning portion of each half cycle of alternating current is conducted between the transformer and rectifying voltage multiplier until the timing ramp exceeds the feedback in amplitude, whereby the power supply is regulated.

11 Claims, 3 Drawing Figures

3,798,531

SWITCHING-MODE POWER SUPPLY

This invention relates to power supplies and more particularly relates to switching-mode power supplies.

Switching-mode power supplies include a switch that is closed during one part and open during another part of each half cycle. They have an advantage over other types of power supplies in that they do not dissipate as much power because the regulating switch is either completely opened or completely closed most of the time, and therefore does not dissipate a significant amount of power.

One class of switching-mode power supplies includes a switch that is closed during the first part of each half cycle of input alternating current to pass the first part of each half cycle, the first part being rectified and converted to d.c. potential, with the time that the switch is opened being controlled by a feedback loop to control the amount of power converted into d.c. power so as to achieve good regulation of the d.c. power. Because the switch is closed during the first part of each half cycle while the amplitude of the a.c. potential is zero, there are no large surge currents upon closing. Because the current falls to zero amplitude when the switch opens, there are no large surge currents upon opening during the half cycle.

In one type of prior art switching-mode power supply of this class, a d.c. switch is included in a portion of the circuit that carries unfiltered d.c. potential. The d.c. switch is switched into its conducting state at the start of each half cycle by a trigger circuit that senses the minimum potential between the rectified half cycles and is switched into its nonconducting state when the output amplitude of the power supply exceeds the desired maximum by a circuit that includes a threshold device to sense the desired maximum output potential.

The prior art switching-mode power supplies of this one class have several disadvantages.

Firstly, they require a plurality of d.c. switches under some circumstances. For example, in a power supply having a rectifying voltage multiplier, there is no one path through which all unfiltered rectified power flows so a different d.c. switch is necessary in each path for the unfiltered rectified power. This increases the cost of the power supply since suitable d.c. switches are expensive components of a power supply.

Secondly, they are not easily adjustable for good regulation across a wide range of input and output powers. Generally, switching-mode voltage regulators provide best regulation when the switch is closed during the greatest portion of each half cycle. To operate under such conditions, the switching threshold for opening the switch must be adjusted for different input and output powers and this is difficult with the prior art switching-mode power supplies of this one class because they utilize a threshold device to establish the output amplitude at which the switch is opened.

Thirdly, the time for closing the switch with respect to the cross-over points of the input a.c. power is not adjustable in this one class of switching mode power supply and the lack of such an adjustment for the time of closing the switch reduces the range of output potentials that the power supply can provide under some circumstances and reduces the regulation of the power supply under other circumstances. If the closing time is not adjusted properly, the switch may at times close during the end portion of each half cycle rather than at cross-over points between each half cycle and the next half cycle or even close a short time after each half cycle has started although the latter event is not commonplace. If the switch closes during the last portion of each half cycle, the power supply is not adjustable to a low output potential because the power from the last part of each half cycle is always applied to the output of the power supply. If the switch closes after each half cycle has started or before it ends, some transients occur because of the closing of the switch after a potential is applied to the input and this degrades the regulation of the power supply.

Fourthly, they are not precise in the amplitude at which the switch is opened because the output amplitude is compared with a fixed threshold so that a slowly increasing output potential is in the range of the switching threshold for a relatively long period of time and may cause switching at any instant in this period of time depending on small variations in potential which variations may be accidental or transient in nature.

Fifthly, they require a post regulator under some circumstances to improve their regulation. The post regulator increases the cost of the power supply.

Accordingly, it is an object of the invention to provide a novel power supply.

It is a further object of the invention to provide a novel power supply of the switching mode class which does not require specially designed components to handle high surge currents.

It is a still further object of the invention to provide a novel switching mode power supply in which the switch is closed at the beginning of each half cycle.

It is a still further object of the invention to provide a switching-mode power supply with a voltage multiplier and a negative feedback loop controlling the d.c. switch.

It is a still further object of the invention to provide a regulated power supply of the switching mode class in which the switch controls a.c. power with one d.c. switch.

It is a still further object of the invention to provide a novel switching-mode power supply that provides good regulation without a post regulator.

It is a still further object of the invention to provide a switching-mode power supply in which the time at which the switch closes is adjustable with respect to the cross-over points of the input a.c. independently of the output potential of the power supply.

It is a still further object of the invention to provide a switching-mode power supply of the type in which the switch closes at each cross-over point of the input a.c. power and in which the switch is adjustable to provide good regulation over a wide range of input and output powers of the power supply.

It is a still further object of the invention to provide a switching-mode power supply in which the switch is opened in response to a comparison between a variable reference and the amplitude of the output potential.

It is a still further object of the invention to provide a novel switching-mode power supply that provides good regulation without a post regulator.

In accordance with the above and further objects of the invention, a regulated power supply of the switching mode class includes a rectifying voltage multiplier, an a.c. switch connected between the rectifying voltage multiplier and the transformer, and a control circuit for controlling the amount of time that the a.c. switch is closed from the beginning of each half cycle of the a.c. input potential to pass electrical power to the rectifying voltage multiplier.

To control the a.c. potential, the a.c. switch includes a d.c. switch and a diode bridge circuit with the d.c. switch being connected across one pair of diagonal connecting points of the diode bridge circuit and each of the other two diagonal connecting points being connected to a different one of the transformer and the rectifying voltage multiplier so that a.c. current is coupled to the voltage multiplier from the transformer when the d.c. switch is closed to pass a.c. current through the diode bridge and the voltage multiplier is disconnected from the transformer when the d.c. switch is in its nonconducting state.

To control the d.c. switch, the control circuit includes a comparator connected to the control electrode of the d.c. switch, a negative feedback path from the output of the power supply to one of the inputs of the comparator and a circuit for generating a timing ramp potential that starts at the cross-over point of the a.c. input potential connected to the other input of the comparator, whereby the comparator causes the d.c. switch to conduct when the timing ramp potential is lower than the feedback signal and to be nonconducting when the timing ramp potential equals or is greater than the feedback signal.

To control the time that the a.c. switch closes, the circuit for generating the timing ramp potential at the crossover points of the a.c. input potential and the a.c. switch each include delay elements, with an amount of delay that is selected for precise timing. The slope of the ramp potential is also controlled by the circuit for generating the timing ramp potential and the amplitude of the signal representing the output of the power supply is controlled in the negative feedback path so that the switch may be closed for large portions of each half cycle.

In operation, the first part of each half wave of the input a.c. potential is conducted through the diode bridge to the rectifying voltage multiplier with the diode bridge conducting the potential through the d.c. switch in the same direction regardless of the polarity of the half wave of a.c. being conducted though the diode bridge. The rectifying voltage multiplier rectifies and increases the potential, applying it as d.c. potential to the output terminals of the power supply.

As the first part of each half wave is conducted through the diode bridge of the a.c. switch, the timing ramp potential and the negative feedback signal are applied to the comparator, with the ramp being lower in amplitude than the feedback signal during the first part of each half cycle to maintain the d.c. switch and therefore the a.c. switch closed.

When the timing ramp potential equals the feedback signal, the comparator drives the d.c. switch to its nonconducting state to disconnect the rectifying voltage multiplier from the transformer until the start of the next half cycle. If the output amplitude of the power supply changes from the set value, the amplitude of the feedback signal changes in the opposite direction, causing the timing ramp potential to equal the feedback potential at a different time and to alter the amount of the half cycle of a.c. input that the d.c. switch permits to pass from the transformer to the rectifying voltage multiplier so as to restore the ouput potential to its set value.

From the above description, it can be understood that the power supply of this invention has the advantages of operating over a wide range of output powers, of providing good regulation, and of being inexpensive.

The range of the power supply is large because the time that the switch is closed is adjustable for precision in the timing.

The power supply provides good regulation because the slope of the timing ramp and the portion of the output potential that is compared with the timing ramp may be selected so that the switch is closed for the largest portion of each half cycle of input potential in normal use for a wide range of input and output powers of the power supply and because the output potential of the power supply is compared with a signal that increases with a relatively large slope beyond the critical setting for opening the switch so that a switching signal is obtained at a precise time rather than at any time in a relatively long period of time.

The power supply is inexpensive for several reasons, such as: (1) a single d.c. switch is able to control the a.c. potential to regulate the output of the power supply even if there is no one path for filtered d.c. potential in the power supply; (2) because the a.c. switch is closed at the start of each half cycle and opened during the half cycle, the power supply does not include a high inductance transformer nor other components to withstand or suppress high surge currents; and (3) a post regulator is not needed to provide good regulation.

The above features and others will be better understood from the following detailed description when considered with reference to the accompanying drawings, in which.

GENERAL STRUCTURE AND OPERATION

Figure 1:
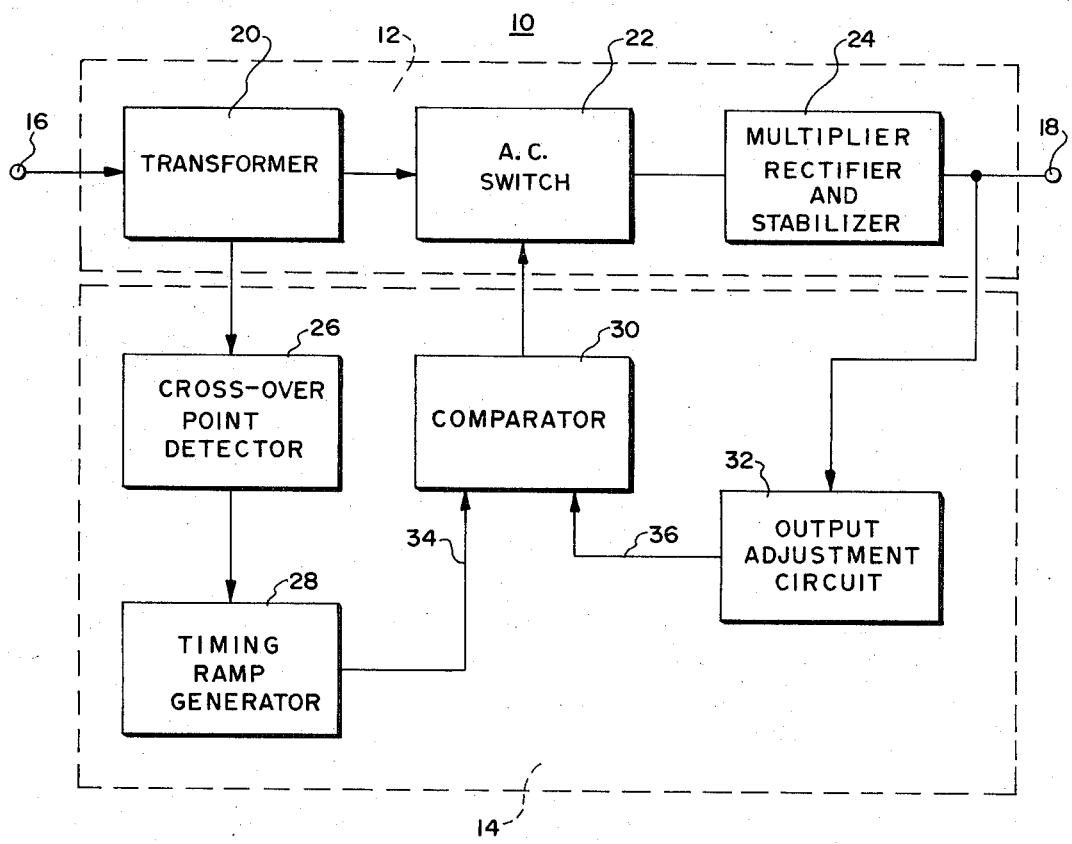
FIG. 1 is a block diagram of a power supply in accordance with the invention.

In FIG. 1 there is shown, in a block diagram, a switching-mode voltage and current regulated power supply 10 having an output control section 12 and a switch control section 14. The output control section 12 converts alternating current electrical power applied to terminal 16 to direct current electrical power which is applied to the output terminal 18 at a closely controlled level of constant potential or constant current. The switch control section 14 is adjustable to select a constant current output or a constant potential output and to select, within a certain range, the amplitude of the constant current or potential.

To convert the alternating current input potential applied to input terminal 16 to a direct current output potential at output terminal 18 and to maintain the amplitude of the output current or potential constant, the output control section 12 includes a transformer 20, an a.c. switch 22 and a multiplier, rectifier and stabilizer 24.

To control the level of the current or potential, the a.c. switch 22 has its input electrically connected to the secondary winding of the transformer 20 to receive the full wave alternating current and has its output electrically connected to the input of the multiplier, rectifier and stabilizer 24, with the primary of the transformer 20 being electrically connected to the terminal 16 to receive the input alternating current and the output of the multiplier, rectifier and stabilizer 24 being electrically connected to the output terminal 18. The a.c. switch 22 is bidirectional and is maintained in a conducting state for a variable portion of each half cycle of the a.c. power from the transformer 20 by the switch control section 14, which acts as a phase control circuit to maintain the a.c. switch 22 in its conducting state from the beginning of each half cycle to a time during the half cycle that is related to the output amplitude of the regulated power supply 10.

The transformer 20 is a low inductance transformer and is coupled to the a.c. switch 22 through a path that does not include any high impedance elements intended to suppress high transient currents. Moreover, the transformer 20, the a.c. switch 22 and the multiplier rectifier and stabilizer 24 are not selected nor designed to handle large surge currents of the type that generally occur in switching mode regulated power supplies in which the switch changes from its nonconducting to its conducting state when the a.c. potential at the input is at an amplitude that is capable of causing such currents rather than changing from its nonconducting to its conducting stat when the a.c. potential is at its zero potential cross-over level between two successive half cycles. Instead, the transformer 20, the a.c. switch 22, and the multiplier, rectifier and stabilizer 24, the components incorporated in them and the coupling between them are relatively low surge current circuits, components and couplings.

The multiplier, rectifier and stabilizer 24 includes circuitry that rectifies the portions of the a.c. voltage conducted to it by the a.c. switch 22, increases the amplitude of the potential and stabilizes the output to provide a regulated d.c. potential or regulated d.c. current to the output terminal 18. This type of circuit is especially compatible with an a.c. switch having negative feedback since it causes a sudden change in the amplitude of the potential from the a.c. switch to be applied to the input of the feedback loop in a series of increments that occur over a longer period of time than the original change, thus increasing the stability of the power supply. Moreover, some types of d.c. switches are not easily incorporated in power supplies that include a rectifying voltage multiplier because such switches are generally closed by minimum amplitude potentials in the unfiltered d.c. waveform but power supplies that include a retifying voltage multiplier generally have no convenient single location through which the unfiltered d.c. power suitable for switching the d.c. switch flows.

To control the a.c. switch and to provide for the regulation of either current or voltage at an adjustable amplitude, the switch control section 14 includes a cross over point detector 26, a timing ramp generator 28, a comparator 30 and an output adjustment circuit 32.

To control the a.c. switch 22, the comparator 30 has a first input conductor 34 adapted to receive a timing ramp potential that starts each time the a.c. input crosses through zero potential and rises linearly with time and a second input conductor 36 adapted to receive a feedback signal through a negative feedback loop, which feedback signal is related to the output amplitude of the regulated power supply, with the output terminal of the comparator 30 being electrically connected to the a.c. switch 22 to maintain the a.c. switch 22 in its conducting state from the time that the a.c. input potential on terminal 16 passes through zero potential until the amplitude of the ramp potential has a predetermined relationship with the amplitude of the output from the regulated power supply 10.

To start the timing ramp potential to the conductor 34, the cross-over point detector 26 includes circuitry connected to the transformer 20 to receive the a.c. potential therefrom and connected to the timing ramp generator 28 to provide a trigger pulse thereto each time the a.c. potential from the transformer 20 crosses through zero potential between half cycles. The timing ramp generator generates the ramp and applies it to conductor 34 upon receiving the trigger pulse from the cross-over point detector 26.

To select either voltage or current to be regulated and to adjust the amplitude at which the output potential or current is maintained by the regulated power supply 10, the output adjustment circuit 32 has its input electrically connected to the output of the regulated power supply at terminal 18 to sense the output of the regulated power supply 10 and has its output electrically connected to conductor 36 to which it provides a potential representing the amplitude of either the current or potential at the terminal 18 as negative feedback. The output adjusting circuit 32 includes a switch to select either current or voltage to be regulated and a potentiometer for setting the amplitude of the output current or potential.

Before operating the regulated power supply 10, the switch on the output adjustment circuit 32 is set to control either the output potential or the output current and the potentiometer is adjusted to set the amplitude of the output current or potential. After these adjustments have been made, the regulated power supply maintains the selected one of the output potential and output current at the set amplitude on output terminal 18.

In operation, an alternating current potential is applied to the a.c. switch through the transformer 20. The a.c. switch 22 closes at the start of each half cycle of the a.c. potential applied to it from the transformer 20 and opens during the half cycle thereby passing a portion of the power to the multiplier, rectifier and stabilizer 24.

Since the a.c. switch is closed at the start of each half cycle, there are no current transients at this time as is the tendency when a switch closes after an alternating current applied to it reaches substantial amplitude. The opening of the a.c. switch 22 during the half cycle does not cause surge currents since the current is being reduced at that time.

The portions of each half cycle that are conducted to the multiplier, rectifier and stabilizer 24 are rectified to provide a d.c. potential which is increased by a rectifying voltage multiplier in the multiplier, rectifier and stabilizer 24 to provide a high d.c. potential to the output terminal 18. The rectifying voltage multiplier also causes any sudden changes in the amplitude of the half cycle of a.c. potential applied to it to result in several incremental changes at its output, which reduces any instability that would otherwise be caused by the sudden change at the input to the negative feedback path from the output adjustment circuit 32 to the comparator 30.

To maintain the amplitude constant, the comparator 30 compares the amplitude of the negative feedback signal representing the output of the power supply with the amplitude of the timing ramp potential and, in accordance with this comparison, opens the a.c. switch during each half cycle to permit only enough of the beginning portion of each half cycle to be conducted to the multiplier, rectifier and stabilizer to maintain the output of the power supply constant.

To apply the negative feedback signal to the comparator 30, the output adjustment circuit 32 senses the amplitude at the output terminal 18 and applies a negative feedback potential to one of the inputs of the comparator 30 through the conductor 36, which negative feedback potential has an amplitude representative of and varying in the opposite direction to the amplitude at output terminal 18.

To apply the timing ramp potential to the comparator, the cross-over point detector 26 applies a trigger pulse to the timing ramp generator 28 at the start of each half cycle of the input a.c. potential, in response to which the timing ramp generator 28 applies a timing ramp potential to the other input of the comparator 30 through the conductor 34.

To compare the feedback signal with the timing ramp potential, the comparator 30 compares the amplitude of the timing ramp from the timing ramp generator 28 and the amplitude of the potential from the output adjustment circuit 32 and causes the a.c. switch 22 to conduct from the beginning of each half cycle of the input a.c. potential until the timing ramp reaches an amplitude equal to that of the potential from the output adjustment circuit 32. Accordingly, when the output amplitude at terminal 18 deviates from its set level, the signal fed back to the comparator 30 by the output adjustment circuit 32 changes in the opposite direction, causing the comparator 30 to change the length of time that the a.c. switch 22 is in its conducting state to restore the output amplitude at terminal 18 to its set level.

More specifically, if the output amplitude increases above the set level, causing the potential applied to the comparator 30 by the output adjustment circuit 32 through the conductor 36 to decrease, the timing ramp potential from the timing ramp generator 28 equals the amplitude of the negative feedback signal on conductor 36 sooner in a cycle of input a.c. potential than when the amplitude at the output terminal 18 is at its set level and the comparator 30 switches the a.c. switch 22 from the conducting to the nonconducting state sooner, thus passing less electrical power from the transformer 20 to the multiplier, rectifier and stabilizer 24 to reduce the amplitude of the output of the regulated power supply 10.

Similarly, if the output amplitude decreases below the set level, causing the potential applied to the comparator 30 by the output adjustment circuit 32 through the conductor 36 to increase, the timing ramp potential from the timing ramp generator 28 does not equal the amplitude of the negative feedback signal on conductor 36 until later in the cycle of input a.c. potential than when the output amplitude was at the set value and the comparator 30 switches the a.c. switch 22 from the conducting to the nonconducting state later, thus passing more electrical power from the transformer 20 to the multiplier, rectifier and stabilizer 24 to increase the amplitude of the output of the regulated power supply 10.

To enable the power supply to be adjusted to minimum amplitude and to high amplitude output powers, the time that the a.c. switch 22 closes can be adjusted precisely thus preventing the switch from closing near the end of a half cycle or shortly after a half cycle starts rather than at the cross-over points of the input a.c. potential. For this purpose, the cross-over point detector 26 and the a.c. switch 22 include delay elements and the amount of delay in these elements is selected for the best operation of the power supply.

The slope of the timing ramp and the amplitude of the feedback signal are also selected to improve the regulation at the design output power for the power amplifier by maintaining the switch closed for the largest part of each half cycle.

SPECIFIC STRUCTURE

Figure 2:
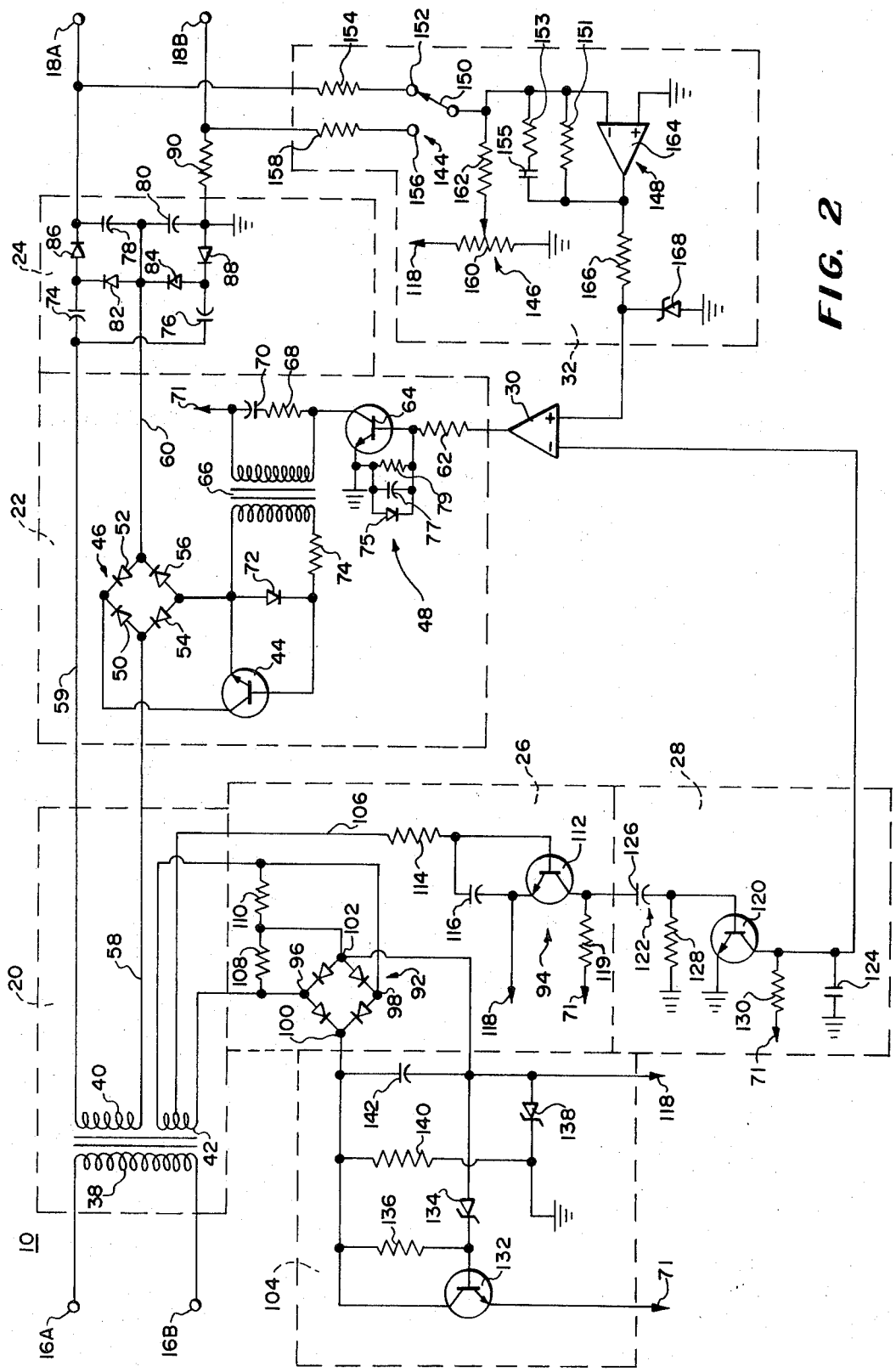
FIG. 2 is a schematic circuit diagram of the power supply of FIG. 1.

In FIG. 2, there is shown a schematic circuit diagram of the switching mode voltage and current regulated power supply 10, with the components shown in FIG. 1 in block diagram form being shown schematically within a hidden-line blocks having corresponding numbers.

As shown in FIG. 2, the transformer 20 includes a single primary 38 connected to the input terminals 16A and 16B and two secondary windings 40 and 42, with the secondary winding 40 being coupled to the a.c. switch 22 and the secondary winding 42 being coupled to the cross-over point detector 26.

The a.c. switch 22 includes a d.c. switch 44, an a.c. connecting circuit 46, and a d.c. switch control circuit 48, with the d.c. switch 44 being a npn transistor in the preferred embodiment.

To control the a.c. potential, the a.c. connecting circuit 46 and the d.c. switch are connected together so that a.c. current flows through the a.c. connecting circuit between the transformer 20 and the multiplier rectifier and stabilizer 24 and flows as rectified direct current through the d.c. switch 44. For this purpose, the a.c. control circuit 46 includes a diode bridge having four arms each including a different one of the four diodes 50, 52, 54 and 56, with the cathodes of the diodes 50 and 52 being connected to the collector of the transistor 44, with the anodes of the diodes 54 and 56 being connected to the emitter of the transistor 44, with the cathode of the diode 54 and the anode of the diode 50 being connected to one end of the secondary winding 40 of the transformer 20 through a conductor 58 and with the cathode of the diode 56 and the anode of the diode 52 being connected to the multiplier, rectifier and stabilizer 24 through a conductor 60. The other end of the secondary winding 40 is not connected to the a.c. connecting circuit but to the input of the multiplier, rectifier and stabilizer 24 through conductor 59.

To control the d.c. switch 44, the d.c. switch control circuit 48 includes a resistor 62, an *npn* transistor 64 and a transformer 66, with one end of the resistor 62 being connected to the output of the comparator 30 and its other end being connected to the base of the *npn* transistor 64, the *npn* transistor 64 having its emitter grounded and its collector connected to a source of positive potential 71 through the primary winding of the transformer 66 so that, when a positive potential is applied to the resistor 62 by the comparator 30, the transistor 64 increases its conductivity and thereby generates a trigger pulse across the primary winding with the resistor 68 and the capacitor 70 being connected across the primary winding to protect the transistor 44 from inductive surges from the transformer when the transistor 44 becomes non-conducting.

To control the time that the transistor 44 closes when the output from the comparator 30 goes in a positive direction as the timing ramp potential falls at the end of each half cycle of the input potential, a diode 75, a capacitor 77 and a resistor 79 are each connected in parallel with each other across the emitter and base of the transistor 64, with the diode having its anode connected to the emitter thereof. This circuit provides one of the time delays which is selected to control the time that the d.c. switch 44 closes.

To apply the trigger pulse to the d.c. switch 44, the transformer 66 has its secondary winding connected at one end to the emitter of the transistor 44 and the anode of a diode 72 and at its other end to the base of the transistor 44 and the cathode of the diode 72 through a resistor 74, with the diode 72 providing reverse voltage protection and the resistor 74 control of the base current of the transistor 44.

The multiplier, rectifier, and stabilizer 24 includes four capacitors 74, 76, 78, and 80 and four diodes 82, 84, 86 and 88 arranged to rectify the a.c. potential applied to it and to quadruple the resulting d.c. potential before applying it to the output by storing charge from successive half cycles in capacitors with an additive polarity. For this purpose, the conductor 60 is connected to the anode of diode 82, the cathode of diode 84 and to one plate of the two capacitors 78 and 80, and the conductor 59 is electrically connected to one plate of the capacitors 74 and 76, with the other plate of the capacitor 78 being connected to the cathode of the diode 86 and the output terminal 18A, the other plate of the capacitor 80 being electrically connected to output terminal 18B through resistor 90 and to the anode of the diode 88, the other plate of capacitor 74 being connected to the cathode of the diode 82 and the anode of the diode 86, and the other plate of the capacitor 76 being connected to the cathode of the diode 88 and the anode of the diode 84.

With this arrangement, the rectifier potential is stored sequentially in the capacitors, which increases the stability of the regulated power supply by causing a sudden change in the amplitude of the input a.c. to result in a step-by-step increase in the output potential as the change in the input potential is stored in successive half cycles in the different capacitors.

To generate a cross-over signal, the cross-over point detector 26 includes a full wave rectifier bridge circuit 92 that generates a potential of minimum amplitude at the cross-over time of the a.c. input potential and a pulse generator circuit 94 that generates a cross-over point pulse upon receiving the minimum amplitude potential from the full wave rectifier bridge.

To generate a potential of minimum amplitude at the time the a.c. input potential to the regulated power supply passes through zero potential between half cycles, the full wave rectifier bridge circuit 92 includes a center tap conductor 106 and a conventional four arm, four diode rectifying bridge having first and second opposite input diagonal connecting points 96 and 98 connected to different ones of the two ends of the secondary winding 42 of the transformer 20 to supply a.c. potential to the rectifier bridge and third and fourth opposite output diagonal connecting points 100 and 102 connected to a power supply unit 104 to be described hereinafter. To balance the full wave rectifier bridge circuit, the diagonal connecting point 102 is electrically connected to the diagonal connecting point 96 through a first resistor 108 and to the diagonal connecting point 98 through a second resistor 110, with the first and second resistors 98 and 110 being equal.

To generate cross-over point pulses, the pulse generator circuit 94 includes an *npn* transistor 112 having its base connected to the conductor 106 through a resistor 114 to receive the low potential points, having its emitter connected to its base through a capacitor 116 for protection against transients and connected to a source of negative potential 118, and having its collector connected to the source of positive potential 71 through a load resistor 119 and to the timing ramp generator 28 to apply pulses to the timing ramp generator when the low potential pulses applied to its base through the conductor 106 causes it to become non-conducting. The capacitance of the capacitor 116 is selected to cause the cross-over point pulses to be applied to the transistor 112 at the precise time for the best operation of the power supply.

To apply timing ramp potentials to the comparator starting at each cross-over point, the timing ramp generator 28 includes a npn transistor 120, a differentiator 122, and a timing capacitor 124.

To control the transistor 120, the differentiator 122 includes a capacitor 126 having one plate connected to the collector of transistor 112 to receive the trigger pulses from the cross-over point detector 26 and a second plate connected to ground through resistor 128 and connected to the base of the transistor 120 to apply differentiated trigger pulses thereto.

To set the timing capacitor 124 and to control the charging time thereof, the transistor 120 has its emitter grounded and its collector connected to the source of positive potential 71 through a load resistor 130, to one plate of the timing capacitor 124, and to the negative input of the differential amplifier 30, with the other plate of the timing capacitor 124 being grounded. With this arrangement, the transistor is driven into conduction by the positive pulse applied to it by the differentiator 122 when the differentiator receives the leading edge of the trigger pulse to discharge and reset the timing capacitor 124 and is driven into its nonconducting state by the differentiated trailing edge of the trigger pulse to start the charging of the timing capacitor 124 and the generation of the timing ramp thereby.

To provide the positive source of d.c. potential 71 and the negative source of d.c. potential 118, the power supply 104 includes: (1) a transistor 132 having its collector electrically connected to the diagonal connecting point 100 of the rectifier bridge circuit 92, having its base connected to the diagonal connecting point 102 of the recitifier bridge circuit 92 through the forward conduction path of a zener diode 134 and to the diagonal connecting point 100 of the rectifier bridge circuit 92 through biasing resistor 136 with the positive source of potential 118 being provided at its emitter; and (2) a zener diode 138 having its cathode grounded and connected to diagonal connecting point 100 through a resistor 140 and having its anode connected to the anode of the zener diode 134, to the diagonal connecting point 102 and to the diagonal connecting point 100 through a capacitor 142, with the negative source of potential 71 being provided at the anode of the zener diode 138.

To provide a potential to the positive input of the comparator 30, the output adjustment circuit 32 includes a mode selection switch 144, an amplitude adjustment switch circuit 146 and an inverting amplifying circuit 148.

To enable the regulated power supply 10 to be switched into either a constant current or a constant voltage mode, the mode selection switch 144 includes a single-pole double-throw switch having its moveable contact 150 electrically connected to the amplitude adjustment switch circuit 146, one of its fixed contacts 152 electrically connected to the terminal 18A through a resistor 154 and the other of its fixed contacts 156 electrically connected to terminal 18B through a resistor 158. When the moveable contact makes contact with the fixed contact 152, potential from the terminal 18A is applied to the output adjustment circuit 32 to control the length of time that the a.c. switch conducts, causing the power supply 10 to be a constant voltage power supply; when the moveable contact 150 makes with the fixed contact 156, the potential developed across resistor 90 by the current flowing therethrough is applied to the output adjustment circuit 32 to control the length of time that the a.c. switch conducts, causing the power supply 10 to be a constant current power supply.

To adjust the amplitude of the current or potential at the output terminals, the amplitude adjustment switch circuit 146 includes potentiometer 160 connected to the source of negative potential 118 at one end and grounded at the other end, with the moveable tap thereof being electrically connected to the moveable contact 150 through a resistor 162. The moveable contact 150 is electrically connected to the inverting amplifier circuit 148 so that a potential is applied to the inverting amplifier circuit 148 that is a weighted difference between the negative potential developed by the adjustment of the potentiometer 160 and the positive potential developed from the output terminals of the regulated power supply.

To invert the potential derived from the output of the power supply, the inverting amplifier circuit 148 includes an operational amplifier 164 having its inverting input electrically connected to the moveable contact 150 and its output terminal electrically connected to the positive input terminal of the differential amplifier 30 through a resistor 166, with a zener diode 168 being connected through its reverse impedance path between the positive input of the differential amplifier 30 and ground. To establish the gain and to reduce the effect of ripple on the feedback circuit, the output and inverting input of the operational amplifier are connected through a resistor 151 and through a resistor 153 and capacitor 155 in series.

DETAILED OPERATION

Before operating the switching-mode regulated power supply 10, the mode of operation is selected to be either in a constant current mode or a constant voltage mode. To operate the switching-mode power supply 10 in a constant voltage mode, the moveable contact 150 of the mode switch 144 is made with the fixed contact 152 so that potential from the output terminal 18A is applied to the feedback loop; to operate the switching-mode regulated power supply 10 in the constant current mode, the moveable contact 150 of the mode switch 144 is switched to the fixed contact 156 to apply the voltage drop across the resistor 90 caused by current flowing through the output terminals of the regulated power supply 10 to the feedback loop.

Before using the switching-mode regulated power supply 10, the output amplitude is adjusted to the appropriate amplitude for the particular use. To adjust the output amplitude, the potentiometer 160 is adjusted while the output amplitude is measured. By adjusting the potentiometer 160, the potential received from the output of the switching-mode regulated power supply is balanced against the negative potential 118 connected to the potentiometer 160 to control the amplitude of the signal applied to the inverting terminal of the operational amplifier 164 for application to the positive input of the differential amplifier 30 that serves as the comparator.

Generally, in operating the switching-mode regulated power supply 10, an a.c. potential applied to the terminals 16 is applied to the a.c. switch 22, which passes a beginning portion of each half cycle to the mulitiplier, rectifier and stabilizer circuit 24. The multiplier, rectifier and stabilizer circuit 24 rectifies the a.c. portions conducted to it by the a.c. switch and multiplies the output value causing controlled d.c. amplitude to appear at the output terminal 18. A feedback circuit from the output terminal 18 includes the output adjustment circuit 32 that selects the mode of control and the amplitude of the output by applying negative feedback to one input of the comparator 30 while control signals from the input a.c. portion of the switching-mode regulated power supply cause a timing ramp to be generated starting with the cross-over point of the input potential and to be applied to the other terminal of the comparitor 30 to control the a.c. switch 22.

Figure 3:
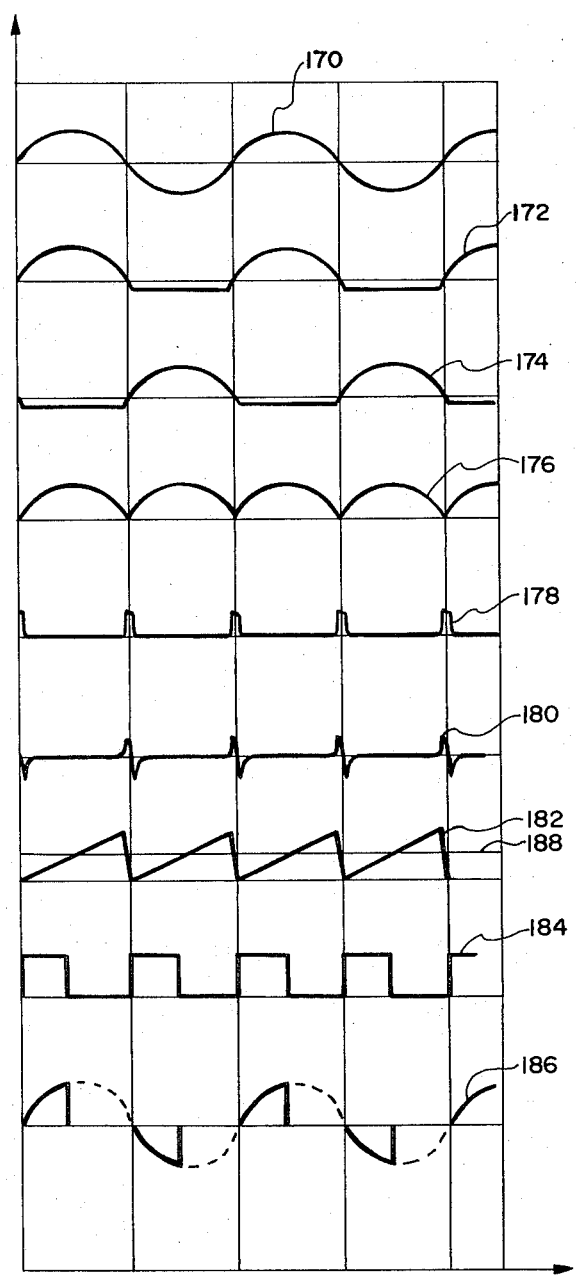
FIG. 3 is a graph illustrating the operation of the power supply of FIG. 1.

In FIG. 3, there is shown a graph having ordinates of voltage and abscissae of time. The graph includes a plurality of curves 170, 172, 174, 176, 178, 180, 182, 184, and 186, each having separate ordinates of voltage and common abscissae, which curves are useful in understanding the detailed operation of the switching-mode regulated power supply and will be referred to hereinafter for this purpose.

Curve 170 illustrates the alternating current input potential that is applied across the terminals 16A–16B of the primary winding 38 of the transformer 20. The secondary winding 40 of the transformer 20 has a corresponding alternating current potential induced in it and applies this potential to the conductors 58 and 59. The conductor 58 is connected to the a.c. switch 22, which connects and disconnects the conductor 58 from the conductor 60 to control the amount of power that is applied through the conductors 59 and 60 to the mulitiplier, rectifier and stabilizer 24 so as to regulate the amplitude of the output of the power supply 10.

In the operation of the a.c. switch 22, current is conducted through the switch from the time that each half-cycle of input a.c. potential starts until the timing ramp potential which is applied to the comparator 30 by the timing ramp generator 28 reaches an amplitude equal to the amplitude applied to the comparator 30 by the output adjustment circuit 32, with the input to resistor 62 from the comparator 30 being positive up to this time and negative after the timing ramp potential exceeds the output potential from the output adjustment circuit 32.

When the input to resistor 62 from the comparator 30 is zero or negative, the a.c. switch disconnects the transformer 20 from the multiplier, recitifer, stabilizer 24 by electrically disconnecting conductor 58 from conductor 60. The resulting waveform is shown in curve 186 wherein the solid portions of the curve show the power that is conducted through the a.c. switch and the hidden line portions of the curve illustrate the portion of the a.c. power that is blocked by the a.c. switch 22.

To electrically connect conductor 58 to conductor 60 for the conduction of alternating current when the output potential of the comparator 30 is positive, the transistor 64 is driven into conduction by the current from the output of the comparator 30 through its base-emitter junction to ground, causing the transistor 44 to be biased into conduction by the potential coupled to its base-emitter circuit from the transistor 64 through the coupling transformer 66. While the transistor 64 is conducting, alternating current flows in one direction during one half of the cycle of a.c. input potential from conductor 58 through diode 50, transistor 44, diode 56, and into conductor 60, in series in the order named, and flows in the other direction during the next half cycle of a.c. input potential from the conductor 60, through diode 52, transistor 44, the diode 54 and into conductor 58, in series in the order named, thus enabling a.c. current to be coupled from the transformer 20 to the multiplier, rectifier, and stabilizer 24 while d.c. current flows through the transistor 44.

To electrically disconnect the conductor 58 from the conductor 60 when the output potential of the comparator 30 is negative or is zero, the transistor 64 is held in its non-conducting state by the negative potential applied to its base by the comparator 30, thus reverse biasing the transistor 44 through the transformer 66 that couples the two transistors and holding the transistor 44 in its nonconducting state. When the transistor 44 is in its nonconducting state, current from the conductor 58 to the conductor 60 is blocked by the diodes 52 and 54 and current from the conductor 60 to the conductor 58 is blocked by the diodes 50 and 56 of the a.c. connecting circuit 46.

While the switching-mode regulated power supply is operating, a signal that is proportional to the output of the power supply is applied through the switch 150 from the terminals of the power supply 10 to the amplitude adjusting circuit 146, where it is balanced against the source of negative potential 118, with the resulting potential being applied to the operational amplifier 164, which inverts it and conducts it as negative feedback to the positive terminal of the differential amplifier 30. Accordingly, if the amplitude of the output from the regulated power supply increases, potential applied to the positive terminal of the differential amplifier 30 decreases, and if the amplitude of the output from the regulated power supply decreases, the amplitude of the potential applied to the positive input terminal of the differential amplifier 30 increases.

The negative input terminal of the differential amplifier 30 receives a timing ramp potential that starts at the cross-over points where the a.c. potential 170 passes through a zero potential value between positive and negative half cycles and increases for the duration of each half cycle. When this ramp potential is less than the potential applied through the negative feedback loop to the positive terminal of the differential amplifier 30, the differential amplifier applies a positive potential to the a.c. switch 22 to connect conductor 58 to conductor 60, thereby passing power from the input of the regulated power supply to the multiplier, rectifier and stabilizer 24; when the ramp potential equals or is greater then the potential applied through the feedback loop of the differential amplifier 30, the differential amplifier 30 provides a zero or negative output to the a.c. switch 22, thus disconnecting conductor 58 from conductor 60 and blocking further power from being applied to the multiplier, rectifier and stabilizer 24.

The ramp voltage is initiated by a trigger pulse from the cross-over point detector 26. To generate this trigger pulse, the secondary winding 42 of the transformer 20 applies an alternating current potential 170 to the full wave rectifier bridge circuit 92 through a balancing resistor arrangement including the resistors 108 and 110. The full wave rectifier bridge circuit 92 rectifies the a.c. potential and applies it to the power supply circuit 104. Rectified half wave potentials also appear across resistors 108 and 110, as respectively illustrated in curve 172 and in curve 174. The potential drops below the zero potential level between half cycles, as shown by curves 172 and 174, because of the forward voltage drop of the diodes in the full wave bridge circuit 92.

The center tap conductor 106 receives a potential that is the sum of the rectified half wave potentials shown in curves 172 and 174. This potential, as shown in curve 172 is reduced to ground level potential between rectified half waves, which correspond in time with the cross-over point of the a.c. input potential illustrated in the curve 170.

The cross-over point trigger pulses, shown by curve 178, are generated by the trigger pulse generator 94 which receives the rectified sum of the half wave potentials illustrated in curve 176. These potentials are applied across the base-emitter junction of the npn transistor 112, which stops conducting at the cross-over points where the potential drops to zero. At this time the transistor 112 generates the trigger pulses shown in curve 178.

To initiate the timing ramp potential and to reset the timing ramp generator 28, the trigger pulses shown in curve 178 are differentiated in the RC differentiator 122 to result in a wave form shown in a curve 180. This wave form has a positive spike just before the cross-over point and a negative spike at a cross-over point of the a.c. input potential illustrated in curve 170. The positive spike drives the npn transistor 120 of the timing ramp generator 128 into conduction, being applied to its base. When the transistor 120 conducts, the capacitor 124 is rapidly discharged, resetting the timing ramp generator 28.

The negative spike of the differentiated potential illustrated by the curve 180 rapidly switches the transistor 120 to its nonconducting state, causing the capacitor 124 to charge from the source of positive potential 71. As the capacitor 124 is charged, its potential increases, causing it to apply the timing ramp potential to the negative input terminal of the differential amplifier 30 for comparison with the potential applied to the positive input terminal through the negative feedback loop. The timing ramp potential is shown in curve 182 over which the negative feedback amplitude 188 is shown.

When the timing ramp 182 is lower in amplitude than the feedback amplitude 188, the transistor 64 conducts, applying pulses 184 to the d.c. switch 44 to drive it to saturation, thus permitting a.c. current 186 to flow between conductor 58 and conductor 60 to the multiplier, rectifier and stabilizer. When the ramp potential 182 equals and passes the potential amplitude 188 from the negative feedback loop, the waveforms 184 are terminated, thus opening the a.c. switch 27 to block further power from being conducted to the multiplier, rectifier and stabilizer. With this control, it can be understood that the output d.c. amplitude is held constant.

The zener diode 168 limits the potential to the positive input of the differential amplifier 30 so that the transistor 64 is not held in its conducting state continuously. If it were to conduct continuously, the d.c. switch 44 would not conduct for a sufficiently long period of time since the transistor 64 and the d.c. switch 44 are a.c. coupled through the transformer 66.

To rectify and multiply the electrical power from the a.c. switch 22 and to stabilize the power supply 10, the multiplier, rectifier and stabilizer 24 receives the portion of the alternating current power shown in curve 186 through the a.c. switch 22 and stores electrical charge in the capacitors 74, 76, 78, and 80 with an additive polarity in a certain sequence during three successive half cycles controlled by the diodes 82, 84, 86, and 88.

The one and one-half cycle sequence is continuous and may be understood from the following three steps of a sequence starting with a positive half cycle, which steps are: (1) during the first positive half cycle of the sequence, the capacitor 78 receives one increment of charge from the input current to the multiplier, rectifier and stabilizer 24 through the diode 86 and the capacitor 76 receives one increment of charge from the same input through the diode 84, with the potential across the capacitor 78 appearing across the output terminals 18; (2) during the first negative half cycle of the sequence, the capacitor 74 receives one increment of charge from the input through the diode 82 and the capacitor 80 receives two increments of charge through the diode 88, one increment being from the input and the other being from the charge stored in capacitor 76 during the previous half cycle, with the potential across the capacitor 80 being applied across the output terminals 18; and (3) during the second positive half cycle, the capacitor 78 receives another increment of charge from the charge stored in the capacitor 74 during the previous half cycle.

Since this sequence is continuous, the multiplier, rectifier, and stabilizer 24 continuously rectifies and quadruples the alternating current from the a.c. switch 22 and applies it to the output terminals 18 and to the input to the feedback loop. Since a change in the amplitude of the input a.c. potential results in three incremental changes in the output amplitude of the multiplier, rectifier and stabilizer 24, a sudden change in the input amplitude results in a slower change at the input to the feedback loop, thus improving the stability and regulation of the voltage regulator by avoiding sudden changes in the potential applied to the input of the feedback loop.

The stability and regulation of the voltage regulator are improved by avoiding sudden changes in the potential applied to the input of the feedback loop because sudden changes applied to the feedback loop are, after a time delay, fed back to the a.c. switch 22 as negative feedback to cause the a.c. switch 22 to make an equally sudden change in the opposite direction, which change again is fed back after another time delay. Sudden changes and delay in a circuit having negative feedback tend to cause damped or permanent oscillation depending upon the gain in the feedback loop.

From the above description, it can be understood that the power supply of this invention has the advantages of operating over a wide range of output powers, of providing good regulation, and of being inexpensive.

The range of the power supply is large because the time that the switch is closed is adjustable for precision in the timing.

The power supply provides good regulation because the slope of the timing ramp and the portion of the output potential that is compared with the timing ramp may be selected so that the switch is closed for the largest portion of each half cycle of input potential in normal use for a wide range of input and output powers of the power supply and because the output potential of the power supply is compared with a signal that increases with a relatively large slope beyond the critical setting for opening the switch so that a switching signal is obtained at a precise time rather than at any time in a relatively long period of time.

The power supply is inexpensive for several reasons, such as (1) a single d.c. switch is able to control the a.c. potential to regulate the output of the power supply even if there is no one path for filtered d.c. potential in the power supply; (2) because the a.c. switch is closed at the start of each half cycle and opened during the half cycle, the power supply does not include a high inductance transformer nor other components to withstand or suppress high surge currents; and (3) a post regulator is not needed to provide good regulation.

Although a preferred embodiment has been described with some particularity, many modifications and variations in the preferred embodiment are possible without deviating from the invention. Accordingly, it is to be understood that, within the scope of the appended claims, the invention can be practiced otherwise than as specifically described.

What is claimed is:

1. A regulated power supply of the switching-mode class having power supply input means adapted to receive alternating current potential and power supply output means adapted to provide direct current power, comprising:

an alternating current switch input means;
   an alternating current switch output means;
   alternating current means for applying said alternating current input potential to said alternating current switch input means;
   alternating current switch means for electrically connecting said alternating current switch input means to said alternating current switch output means at the beginning of at least certain half cycles of said alternating current potential and for disconnecting said alternating current switch input means from said alternating current switch output means at a controlled time during said certain cycles, whereby beginning portions of said half cycles of alternating current potential are applied to said alternating current switch output means;

rectifier means for rectifying said beginning portions of said half cycles, whereby direct current is formed;

said rectifier means being electrically connected between said alternating current switch output means and said power supply output means, whereby direct current is applied to said power supply output means; and control means for controlling the time said alternating current switch disconnects said alternating current switch input means from said alternating current switch output means during said certain cycles, whereby a selected characteristic of said output direct current power is controlled;

said alternating current switch means including means for forming an alternating current connection between the alternating current switch input means and the alternating current switch output means;

said control means including a feedback input means and a feedback output means;

said feedback input means being electrically connected to said power supply output means;

said control means further including feedback means for providing a feedback signal to said feedback output means that varies inversely with said selected characteristic of said output direct current power, a timing circuit output means, timing means for applying the timing ramp potential to said timing circuit output means starting between half cycles of said alternating current potential, and comparator means electrically connected to said feedback output means and said timing circuit output means, for causing said alternating current switch means to disconnect said alternating current switch input means from said alternating current switch output means when said timing ramp potentials and said feedback signals have a predetermined relationship.

2. A regulated power supply according to claim 1 in which said feedback means includes means for providing a feedback signal to said feedback output means that varies inversely with the potential of said direct current power.

3. A regulated power supply according to claim 1 in which said feedback means includes means for providing a feedback signal to said feedback output means that varies inversely with the amplitude of the current of said direct current power.

4. A regulated power supply according to claim 1 in which said rectifier means includes a rectifying voltage multiplier.

5. A regulated power supply according to claim 4 in which said rectifying voltage multiplier is a full wave rectifying voltage multiplier.

6. A regulated power supply of the switching-mode class having power supply input means adapted to receive alternating current potential and power supply output means adapted to provide direct current power, comprising:

an alternating current switch input means;
an alternating current switch output means;
alternating current means for applying said alternating current input potential to said alternating current switch input means;

alternating current switch means for electrically connecting said alternating current switch input means to said alternating current switch output means at the beginning of at least certain half cycles of said alternating current potential and for disconnecting said alternating current switch input means from said alternating current switch output means at a controlled time during said certain cycles, whereby beginning portions of said half cycles of alternating current potential are applied to said alternating current switch output means;

rectifier means for rectifying the beginning portions of said half cycles, whereby direct current is formed;

said rectifier means being electrically connected between alternating current switch output means and said power supply output means whereby direct current is applied to said power supply output means; and control means for controlling said time said alternating current switch means disconnects said alternating current;

switch input means from said alternating current switch output means during certain cycles, whereby a selected characteristic of said output direct current power is controlled;

said alternating current switch means including a direct current switch having a direct current switch input means and a direct current switch output means and rectifier bridge means for connecting said alternating current switch input means to said direct current switch input means through a first rectifier current path, for connecting said alternating current output means to said direct current switch input means through a second rectifier current path, for connecting said direct current switch output means to said alternating current switch input means through a third rectifier current path and for connecting said direct current switch output means to said alternating current switch output means through a fourth rectifier current path, whereby an alternating current path is formed between said alternating current switch input and output means under the control of said direct switch;

said rectifier means including a rectifying voltage multiplier.

7. A regulated power supply according to claim 6 in which said control means includes:

a feedback input means;
a feedback output means;
said feedback input means being electrically connected to said power supply output means;
feedback means for providing a feedback signal to said feedback output means that varies inversely with said selected characteristic of said output direct current power;
a timing circuit output means;
timing means for applying timing ramp potentials to said timing circuit output means starting between half cycles of said alternating current potential; and comparator means, electrically connected to said feedback output means and said timing circuit output means, for causing said alternating current switch means to disconnect said alternating current switch input means from said alternating current output means when said timing ramp potentials and said feedback signals have a predetermined relationship.

8. A regulated power supply of the switching-mode class having power supply input means adapted to receive alternating current potential and power supply output means adapted to receive direct current power, comprising:

an alternating current switch input means;
an alternating current switch output means;
alternating current means for applying said alternating current input potential to said alternating current switch input means;
alternating current switch means for electrically connecting said alternating current switch input means to said alternating current switch output means at the beginning of at least certain half cycles of said alternating current potential and for disconnecting said alternating current switch input means from the alternating current switch output means at a controlled time during said certain half cycles, whereby beginning portions of said half cycles of alternating current potential are applied to said alternating current switch output means;
rectifier means for rectifying said beginning portions of said half cycles, whereby direct current is formed;
said rectifier means being electrically connected between said alternating current switch output means and said power supply output means, whereby direct current is applied to said power supply output means; and
control means for controlling the time said alternating current switch means disconnects said alternating current switch input means from said alternating current switch output means during certain cycles whereby selected characteristics of said output direct current power is controlled;
said rectifier means including a full-wave rectifying voltage multiplier.

9. A regulated power supply of the switching-mode class having power supply input means adapted to receive alternating current potential and power supply output means adapted to provide direct current power, comprising:

an alternating current switch input means;
an alternating current switch output means;
alternating current means for applying said alternating current input potential to said alternating current switch input means;
alternating current switch means for electrically connecting said alternating current switch input means to said alternating current switch output means at the beginning of at least certain half cycles of said alternating current potential and for disconnecting said alternating current switch input means from said alternating current switch output means at a controlled time during said certain cycles, whereby beginning portions of the half cycles of alternating current potential are applied to said alternating current switch output means;
rectifier means for rectifying said beginning portions of said half cycles, whereby direct current is formed;
rectifier means being electrically connected between said alternating current switch output means and said power supply output means, whereby direct current is applied to said power supply output means;
control means for controlling the time said alternating current switch means disconnects said alternating current switch input means from the alternating current switch output means during said certain cycles, whereby a selected characteristic of said output direct current power is controlled; and
delay means for controlling the time with respect to the time of the cross-over points of said alternating current potential that said alternating current switch means connects said alternating current switch input means to said alternating current switch output means.

10. A regulated power supply according to claim 4 further including means for controlling the slope of said timing ramp potential and for controlling the amplitude range of said feedback signal, whereby said slope and amplitude range may be selected to enable said alternating current switch input means to be connected to said alternating current switch output means for a large portion of each half cycle of said alternating current potential so as to provide good regulation to said power supply.

11. A regulated power supply according to claim 1 further including delay means for controlling the time with respect to the time of the cross-over points of said alternating current potential that said alternating current switch means connects said alternating current switch input means to said alternating current switch output means.

* * * * *

UNITED STATES PATENT OFFICE
CERTIFICATE OF CORRECTION

Patent No. 3,798,531          Dated March 19, 1974

Inventor(s) Robert W. Allington

It is certified that error appears in the above-identified patent and that said Letters Patent are hereby corrected as shown below:

Column 18, line 45 the word "current" is inserted before the word "switch".

Column 18, lines 20-24 are changed from:

"control means for controlling said time said alternating current switch means disconnects said alternating current;

switch input means from said alternating current switch output means during certain cycles."

to:

"control means for controlling said time said alternating current switch means disconnects said alternating current switch input means from said alternating current switch output means during certain cycles."

Signed and sealed this 6th day of August 1974.

(SEAL)
Attest:

McCOY M. GIBSON, JR.
Attesting Officer

C. MARSHALL DANN
Commissioner of Patents